J. A. Cameron,
Bee Hive.
No. 86,643. Patented Feb. 9, 1869.
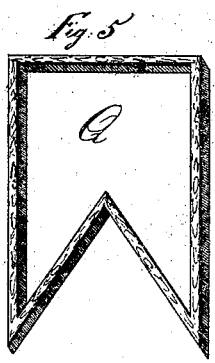
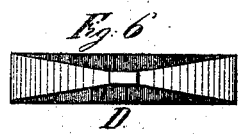
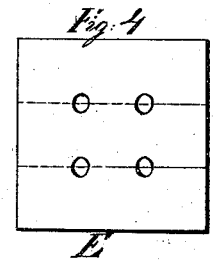
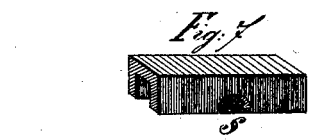
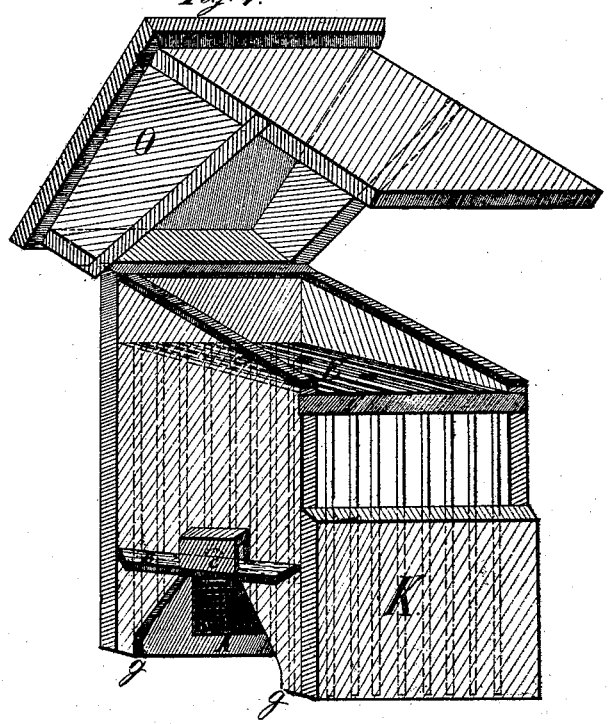
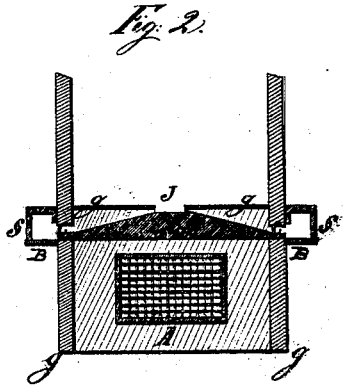
Witnesses
N. C. Hunt
J. E. Finley
James Alexander Cameron Inventor

JAMES ALEXANDER CAMERON, OF MEMPHIS, TENNESSEE.

Letters Patent No. 86,643, dated February 9, 1869.

IMPROVEMENT IN BEE-HIVES.

The Schedule referred to in these Letters Patent and making part of the same.

*To all whom it may concern:*

Be it known that I, JAMES ALEXANDER CAMERON, of the city of Memphis, county of Shelby, and State of Tennessee, have invented an Improvement in Bee-Hive. I have named it "Moth-Excluding Egyptian Bee-Hive;" and I do hereby declare that the following is a full description thereof, reference being had to the accompanying drawings, and letters of reference marked thereon.

Figure 1 is a perspective view.

Figure 2 is a half of hive, displaying the entrances to the hive, and ventilators.

Figure 4, honey-board, made of glass, in three or more pieces, with holes to admit the bees from main hive to supers.

Figure 5, movable frames, these being eight in number.

Figure 6, floor-board, or lower section to hive-entrance.

Figure 7, moth-decoy, one being placed over entrances on each side of hive.

This hive contains two thousand and sixteen cubic inches, and, by actual tests in practical use, is so constructed as to effectually exclude the moth or other insects, first, by the moth-decoy, second, by the other two entrances, through which they have to pass before reaching the interior of the hive.

The second object desired in its construction is ventilation; also to facilitate the bees in removing their dead, and other hive-work.

A represents the ventilator, made of any perforated material.

B B represent the alighting-boards, placed, one on each side of hive, directly under the outer entrance and ventilator C C.

C C represent the outer entrances, and ventilator.

J represents the inner entrance and ventilator.

D represents the lower section of entrance, or floor-board.

E represents the honey-board, made of one or more pieces of window-glass, with holes, to permit the bees to pass into the super from main section of hive. They being made of glass, the bees are enabled more effectually to guard against insects and the moth-worm.

*g g g*, the $\wedge$-shaped bottom of hive.

Q represents movable frames, eight in number, shaped to fit bottom part of hive.

S represents the moth-decoy, open at each end, with a third entrance to hive in its side, to fit over outer entrance to hive and ventilator.

The construction at the bottom is in the shape of letter V inverted, no opening at the lower, but upper angle, thus making a safe entrance to hive under the inverted V, by the aid of B, C C, D, and S.

In the ventilation of hive, A being lower than J, C C, and S, the cold air passes in at A, expelling the heated air in the hive out through J, C C, and S, thus keeping the hive at an even temperature.

O, the cap, adjusted without hinges, as shown in fig. 1.

What I claim as this, my invention, and desire to obtain Letters Patent for, is—

1. A hive, constructed at its lower section in the shape of a V, inverted, in combination with D, floor-board of entrance, C C, outer entrance, J, inner entrance, S, moth-decoy, and B, alighting-board, as constructed, combined, and arranged.

2. The arrangement of perforated plates A, inner opening J, entrance-passages C C, and moth-decoy S, whereby the ventilation of the hive is effected, when these several parts are combined as set forth.

3. The combination of removable cover O, glass honey-board E, movable frames Q, and moth-decoy S, when the several parts are constructed and arranged as specified.

JAMES ALEXANDER CAMERON.

Witnesses:
H. C. HUNT,
J. E. FINLEY.